United States Patent
Zhang et al.

(10) Patent No.: US 8,610,632 B2
(45) Date of Patent: Dec. 17, 2013

(54) ADAPTIVE TUNABLE ANTENNAS FOR WIRELESS DEVICES

(75) Inventors: Yang Zhang, San Diego, CA (US); Jack Steenstra, San Diego, CA (US); Ernest T. Ozaki, San Diego, CA (US); Jui-Yao Lin, San Diego, CA (US); Kirk S. Taylor, San Diego, CA (US); Liren Chen, San Diego, CA (US); Guilherme Luiz Karnas Hoefel, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 0 days.

(21) Appl. No.: 13/461,490

(22) Filed: May 1, 2012

(65) Prior Publication Data

US 2012/0212382 A1   Aug. 23, 2012

Related U.S. Application Data

(62) Division of application No. 12/133,737, filed on Jun. 5, 2008.

(60) Provisional application No. 61/036,854, filed on Mar. 14, 2008.

(51) Int. Cl.
*H01Q 1/00* (2006.01)
*H01Q 11/12* (2006.01)

(52) U.S. Cl.
USPC ............ 343/722; 343/723; 343/745; 343/860

(58) Field of Classification Search
USPC .......... 343/700 MS, 702, 745, 846, 850, 860, 343/722, 723, 876
See application file for complete search history.

(56) References Cited

U.S. PATENT DOCUMENTS

| | | | |
|---|---|---|---|
| 7,072,620 B2 | 7/2006 | Tran | |
| 7,372,406 B2 * | 5/2008 | Shiotsu et al. | ......... 343/700 MS |
| 7,408,517 B1 | 8/2008 | Poilasne et al. | |
| 7,409,245 B1 | 8/2008 | Larson et al. | |
| 7,522,120 B2 * | 4/2009 | Min | .............................. 343/876 |

(Continued)

FOREIGN PATENT DOCUMENTS

| | | |
|---|---|---|
| CN | 1254925 C | 5/2006 |
| CN | 1774837 A | 5/2006 |

(Continued)

OTHER PUBLICATIONS

International Search Report and Written Opinion—PCT/US2009/037205, International Search Authority—European Patent Office—Dec. 4, 2009.

(Continued)

*Primary Examiner* — Hoang V Nguyen
(74) *Attorney, Agent, or Firm* — S. Hossain Beladi

(57) ABSTRACT

Techniques for adjusting one or more antenna parameters to optimize the performance of a wireless device are disclosed. In an embodiment, a variable antenna electrical length module is provided with a control signal for selecting a preferred antenna electrical length. Further techniques for accommodating multiple antennas are disclosed.

73 Claims, 11 Drawing Sheets

(56) References Cited

U.S. PATENT DOCUMENTS

| | | |
|---|---|---|
| 7,551,146 B2 | 6/2009 | Pan et al. |
| 7,633,355 B2 | 12/2009 | Matsuo |
| 7,663,555 B2 | 2/2010 | Caimi et al. |
| 7,840,200 B2 | 11/2010 | Kang et al. |
| 8,026,773 B2 | 9/2011 | Zhu et al. |
| 2004/0242289 A1 | 12/2004 | Jellicoe et al. |
| 2005/0255818 A1 | 11/2005 | Watabe |
| 2006/0132360 A1 | 6/2006 | Caimi et al. |
| 2006/0246849 A1 | 11/2006 | Tran |
| 2006/0279469 A1 | 12/2006 | Adachi et al. |
| 2008/0136729 A1 | 6/2008 | Kang et al. |
| 2008/0180345 A1 | 7/2008 | Larson et al. |
| 2009/0231220 A1 | 9/2009 | Zhang et al. |

FOREIGN PATENT DOCUMENTS

| | | |
|---|---|---|
| CN | 1778049 A | 5/2006 |
| CN | 1871799 A | 11/2006 |
| CN | 1878254 A | 12/2006 |
| EP | 1298810 | 4/2003 |
| JP | 2007312230 A | 11/2007 |
| KR | 20070068182 A | 6/2007 |
| KR | 100763994 B1 | 10/2007 |
| RU | 65701 | 8/2007 |
| TW | 200705743 | 2/2007 |

OTHER PUBLICATIONS

Taiwan Search Report—TW098108316—TIPO—Nov. 6, 2012.

\* cited by examiner

ADAPTIVE TUNABLE ANTENNAS FOR WIRELESS DEVICES

PRIORITY

This application is a divisional of U.S. patent application Ser. No. 12/133,737 titled "ADAPTIVE TUNABLE ANTENNAS FOR WIRELESS DEVICES," filed Jun. 5, 2008, inventors Yang Zhang et al., which claims the benefit of U.S. Provisional Application No. 61/036,854 titled "ADAPTIVE TUNABLE ANTENNAS FOR WIRELESS DEVICES," filed Mar. 14, 2008, both of which are incorporated herein by reference.

TECHNICAL FIELD

The present disclosure relates to antennas for wireless communications devices, and particularly, to antennas having parameters tunable to optimize performance.

BACKGROUND

The advent of broadband wireless communications has allowed delivery of rich multimedia content to users on the go. To support such communications, a wireless device may be plugged into a multimedia user terminal, with the wireless device transmitting and receiving the information-containing communications signals, and the user terminal delivering the information to the user in the form of text, graphics, audio, video, etc. For example, a MediaFLO receiver can be plugged into a user terminal such as a mobile phone or a personal computer to enable the user to watch TV over a MediaFLO air interface. Other examples of wireless communications devices include a data card supporting the CDMA2000 EV-DO standard, a data card supporting the UMTS standard, a receiver supporting the DVB-H and/or ISDB-T standards, a data card supporting the GPRS/EDGE standard, and a data card supporting the WiFi standard.

It has been noted that the electrical characteristics of an antenna in the wireless device often vary depending on the physical characteristics of the terminal device coupled to. For example, the quality of the antenna match, gain, and/or radiation pattern may all vary depending on the terminal device size and terminal device position relative to the wireless device. This change in electrical characteristics may adversely affect the transmission or reception of the communications signal, increasing the cost of the wireless device and/or resulting in poorer or even unacceptable performance.

It would be desirable to provide for techniques to optimize the antenna performance based on the characteristics of the terminal device coupled to.

SUMMARY

An aspect of the present disclosure provides a method for setting an electrical length or resonant frequency for an antenna in a wireless device, the method comprising: coupling a control signal to a variable antenna electrical length module, the variable antenna electrical length module having a plurality of selectable lengths; and selecting the length of the variable antenna electrical length module in response to the control signal.

Yet another aspect of the present disclosure provides a wireless device comprising: least one antenna; a variable antenna electrical length module the variable antenna electrical length module having a plurality of selectable lengths; and a controller a control signal, wherein the variable antenna electrical length module is configured to select one length in response to the control signal.

DETAILED DESCRIPTION

According to the present disclosure, techniques are provided to optimize the performance of an antenna in a wireless device by adjusting parameters associated with the antenna.

Figure 1:
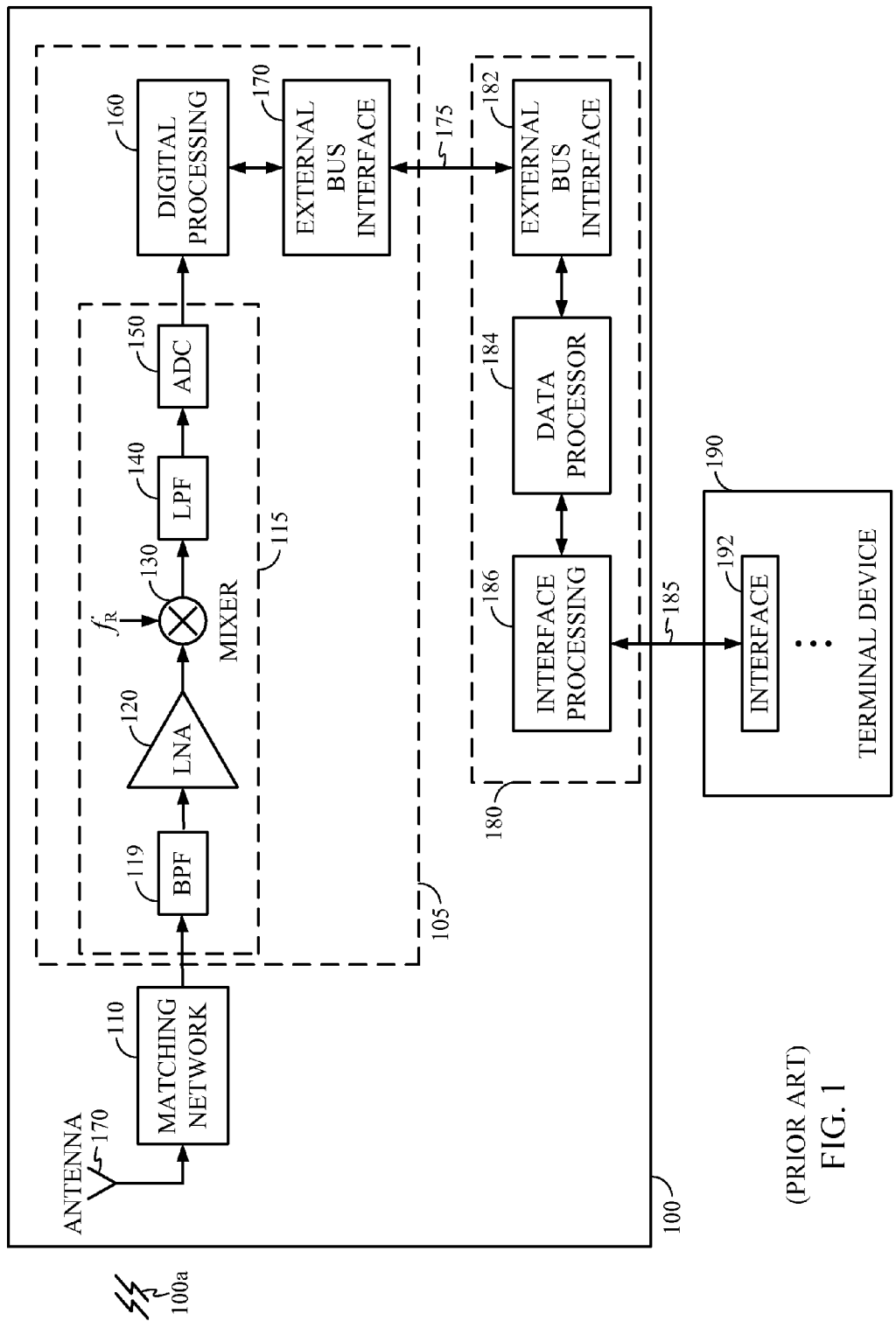
FIG. 1 depicts a prior art implementation of a wireless device coupleable to a terminal device.

FIG. 1 depicts a prior art implementation of a wireless device 100 coupleable to a terminal device 190. In FIG. 1, the wireless device 100 includes an antenna 170, an antenna matching network 110, an RF module 105, and a processor 180. A receive chain (RX) 115 on the RF module 105 includes a band-pass filter (BPF) 119, low-noise amplifier (LNA) 120, a mixer 130, a low-pass filter (LPF) 140, and an analog-to-digital converter (ADC) 150. The digitized output of the ADC 150 may be provided to a digital processing block 160, which communicates with processor 180 over a bus 175. An external bus interface control 170 in RF module 105 and an external bus interface control 182 in processor 180 are designed to transmit and receive signals over the bus 175.

The processor 180 further includes a data processing engine 184 and terminal interface control 186 for communicating with the terminal device 190, which includes a wireless device interface control 192. The processor 180 on the wireless device 100 communicates with the terminal device 190 over an interface 185 via the terminal interface control 186 and wireless device interface control 192.

During operation, a wireless signal 100a is received by antenna 170. Antenna 170 is coupled to the RF module 105 via an antenna matching network 110, which matches the impedances between the antenna 170 and the RF module 105 to improve the efficiency of power transfer. The information in signal 100a is processed by the RF module 105 and provided to the processor 180. The processor 180 may process the signal 100a specifically according to a wireless protocol or standard used to transmit the signal 100a. The processed information is then transferred to the term singal device 190 over interface 185.

While a direct conversion receiver architecture has been depicted in the embodiment shown in FIG. 1, one of ordinary skill in the art will appreciate that the techniques of the present disclosure may generally be applied to devices having any receiver architecture. Also, while only an RX portion 115 is depicted in the RF module 105 of FIG. 1, in general a transmitter chain (TX) portion (not shown) may also be present. One of ordinary skill in the art will understand that the techniques of the present disclosure may be applied to implementations wherein a wireless device 100 includes only an RX portion 115 for reception, only a TX portion for transmission, or both RX and TX.

One of ordinary skill in the art will realize that the implementation of FIG. 1 covers a wide variety of application scenarios. Examples of a wireless device 100 include, but are not limited to, a CDMA2000 EV-DO data card, a UMTS data card, a DVB-H receiver, an ISDB-T receiver, a MediaFLO receiver, a GPRS/EDEG data card, a WiMax data card, a GPS receiver, and a WiFi data card. Examples of the terminal device 190 include, but are not limited to, a personal computer (PC), a mobile phone, a personal digital assistant (PDA), a game console, a OPS device, a TV, an entertainment system, and a portable DVD or MP3 player. Examples of interfaces 185 include, but are not limited to, a Universal Serial Bus (USB) interface, a mini-USB or micro-USB interface, a serial or parallel data interface, a PCMCIA interface, any memory card interface, and any other interfaces that provide a physical connection between a wireless device and a host device.

In FIG. 1, the wireless device 100 may be designed to be physically connected to and removed from the terminal device 190. As earlier noted, the electrical characteristics of the antenna 170 may be affected by the physical characteristics of the terminal device 190 coupled to the wireless device 100. For example, the ground plane of the antenna 170 may be electrically coupled to the chassis of the terminal device 190. As the wireless device 100 is connected to terminal devices 190 of varying size, shape, and/or position relative to the antenna and other conducting objects, parameters such as antenna matching, gain, and radiation pattern may vary greatly depending on the terminal device. Such variations may make the design margins for the wireless device more stringent, leading to poorer performance and/or higher cost. In some cases, the degradation in antenna performance may even render the wireless device unusable.

Figure 2:
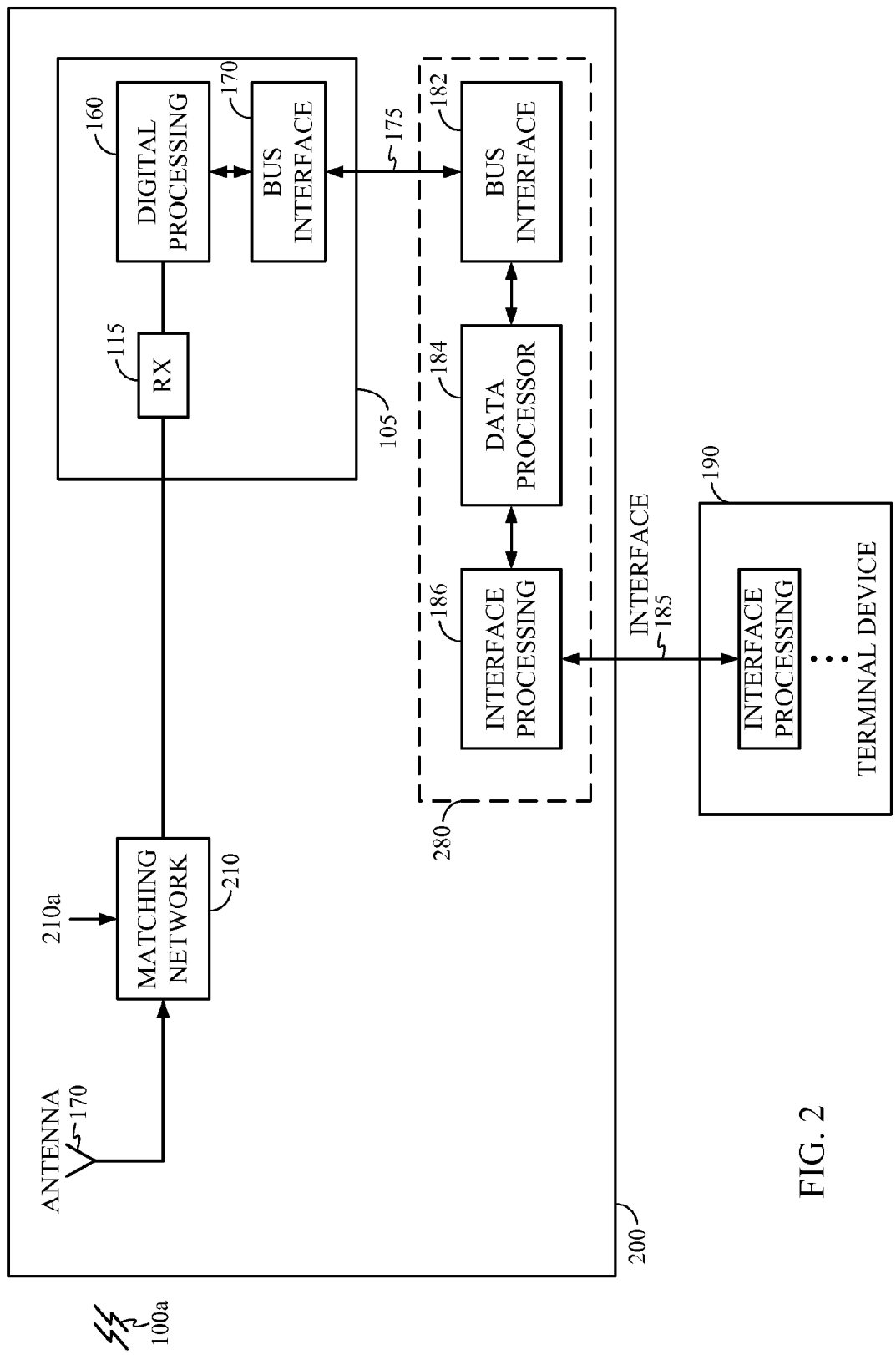
FIG. 2 depicts an embodiment according to the present disclosure for varying the electrical characteristics of wireless device by adjusting the parameters of the antenna matching network.

FIG. 2 depicts an embodiment according to the present disclosure for varying the electrical characteristics of wireless device 100 by adjusting the parameters of an antenna matching network in the wireless device. In FIG. 2, numbered elements shown correspond to identically numbered elements in FIG. 1. A matching network 210 having adjustable matching characteristics is coupled between the antenna 170 and RF module 105. The characteristics of the matching network 210 is controlled by a control signal 210a.

In an embodiment, control signal 210a is dynamically adjusted to at least partially compensate for changes in the antenna characteristics due to, e.g., coupling of the wireless device 100 to a different terminal device 190. An embodiment of a technique to perform such dynamic compensation is described later herein with reference to FIG. 5.

Figure 2A:
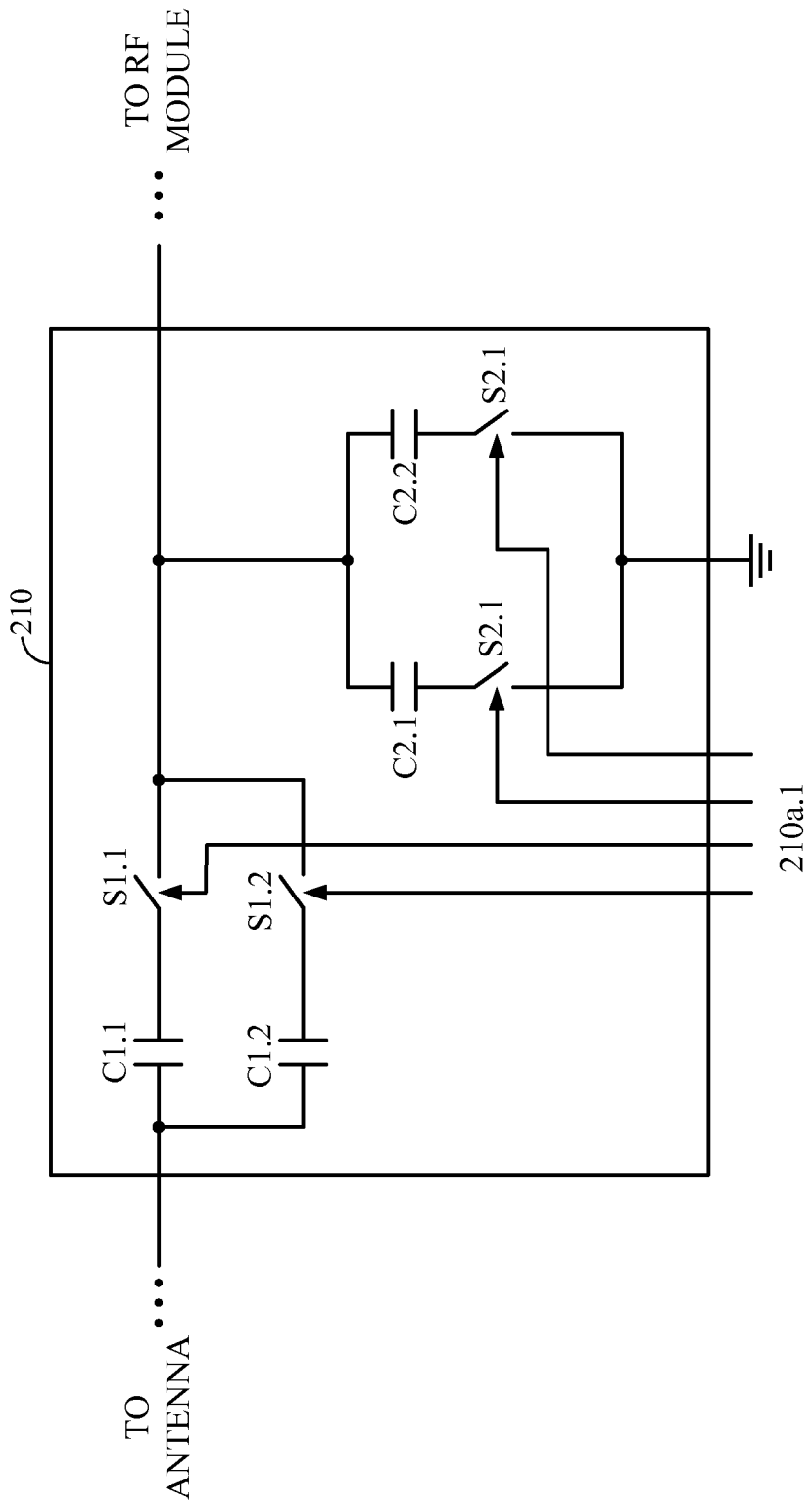
FIG. 2A shows an embodiment of a matching network having adjustable matching characteristics controlled by a control signal.

FIG. 2A shows an embodiment of a matching network 210 having adjustable characteristics controlled by a control signal 210a.1, which is an embodiment of control signal 210a. In FIG. 2A, a matching network 210 includes a plurality of capacitors C1.1, C1.2, C2.1, and C2.2, coupled to switches S1.1, S1.2, S2.1, and S2.2, respectively. The configuration of the switches is controlled by control signal 210a.1, which in this case is seen to be a composite control signal comprising four individual control signals. By controlling the configuration of the switches, control signal 210a.1 may control the characteristics of the matching network 210.

For example, to select a matching network with only capacitors C1.1 and C2.1 enabled, switches S1.1 and S2.1 may be closed, while switches S1.2 and S2.2 may be opened.

In an embodiment, control signal 210a.1 may be supplied by RF module 105. In alternative embodiments, the signal 210a.1 may be supplied by data processor 180, or by any other available source.

Note the embodiment shown in FIG. 2A is provided for illustration purposes only, and is not meant to limit the scope of the present disclosure to any particular embodiment of a matching network or control signal shown. For example, to provide varying degrees of configurability, alternative embodiments may employ fewer or more capacitors and switches than the four shown in FIG. 2A. Alternative embodiments may also employ other elements such as any number of inductors, transmission lines, etc., in combination or separately, and/or employ alternative topologies not shown in FIG. 2A. Furthermore, the control signal 210a.1 is only provided as an example of a generalized control signal 210a. Alternative control signals may have different configurations and settings depending on the matching network to be adjusted. Such embodiments are contemplated to be within the scope of the present disclosure.

Figure 3:
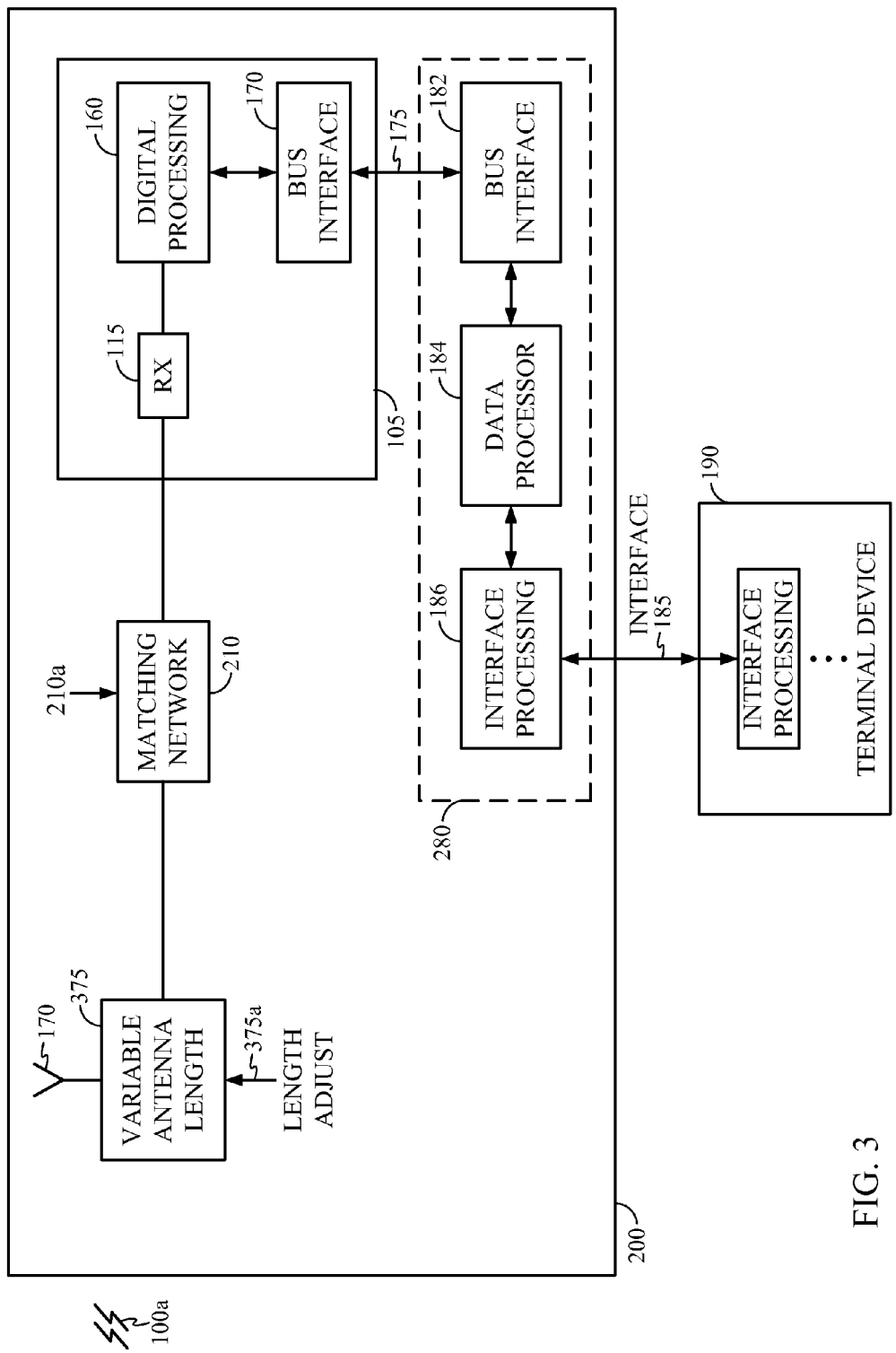
FIG. 3 depicts a further embodiment according to the present disclosure for varying the electrical characteristics of wireless device by adjusting the antenna resonant frequency.

FIG. 3 depicts a further embodiment according to the present disclosure for varying the electrical characteristics of wireless device 100 by adjusting the antenna electrical length, or resonant frequency. In FIG. 3, a variable antenna length module 375 modifies the electrical length of the antenna 170. The electrical length of antenna 170 may be controlled by a control signal 375a coupled to the variable length antenna block 375. In an embodiment, control signal 375a is dynamically adjusted to at least partially compensate for changes in the antenna characteristics. An embodiment of a technique to perform such dynamic compensation is described later herein with reference to FIG. 5.

Note while the variable antenna length module 375 is shown in FIG. 3 as being separate from antenna 170, in some embodiments of the present disclosure, the antenna 170 may be integrated with the variable antenna length module 375.

Figure 3A:
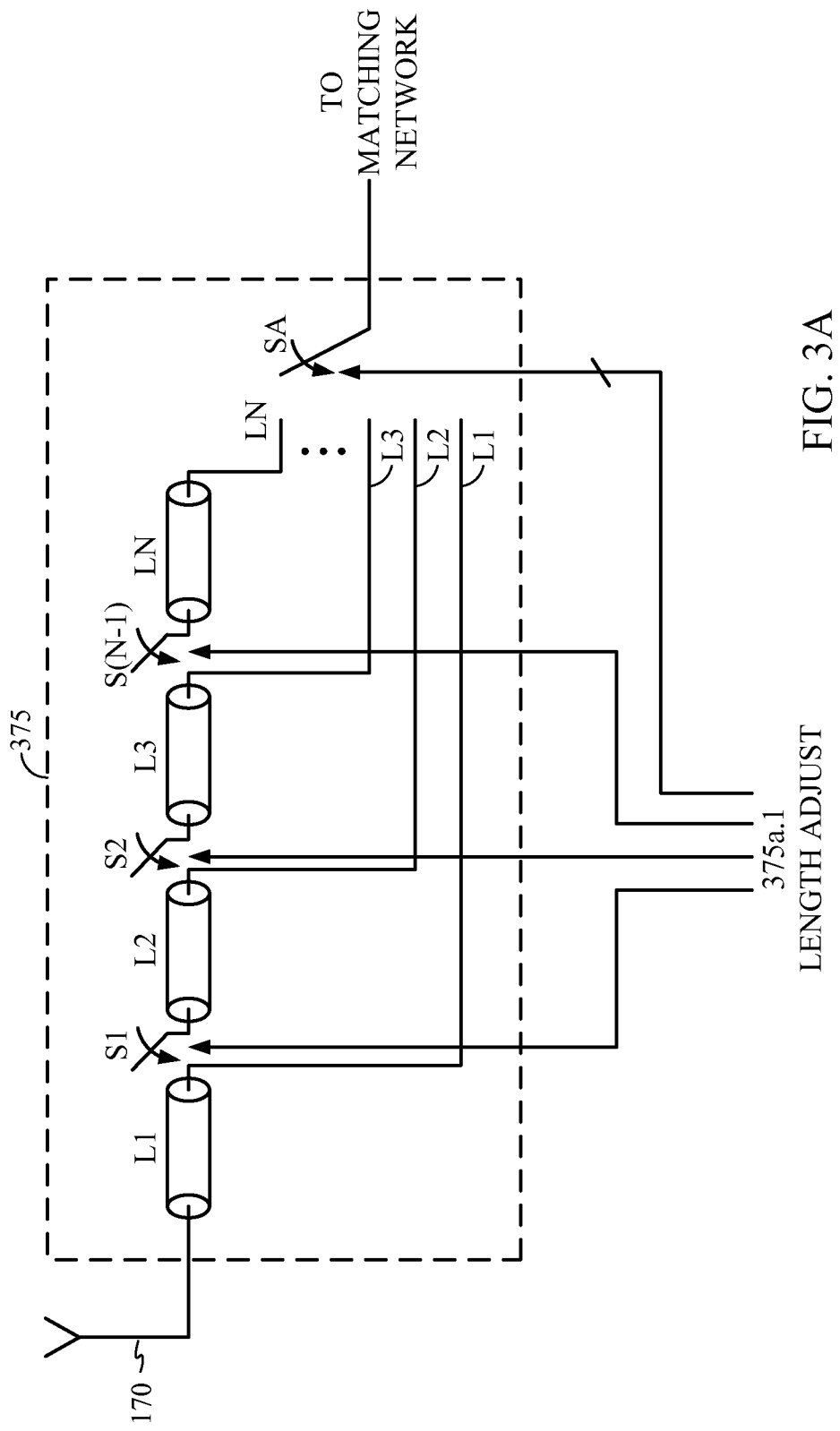
FIG. 3A shows an embodiment of an antenna having electrical length adjustable by a control signal.

FIG. 3A shows an embodiment of an antenna having electrical length adjustable by a control signal. In FIG. 3A, a plurality of conductors L1 through LN are coupled in series using switches S1 through S(N-1). The configuration of these switches, along with the configuration of a main switch SA, is controlled by control signal 375a.1, which is seen to be a composite control signal comprising a plurality of individual control signals. By controlling the configuration of the switches, control signal 375a.1 may control the physical, and hence electrical, length of the antenna.

For example, to select an antenna length corresponding to L1, switches S1 through S(N-1) may all be opened, and the switch SA may be set to the lead corresponding to L1. To select an antenna length corresponding to the sum of the lengths of conductors L1 through LN, switches S1 through S(N-1) may all be closed, and switch SA may be set to the lead corresponding to LN.

Note the embodiment shown in FIG. 3A is provided for illustration purposes only, and is not meant to limit the scope of the present disclosure to any particular embodiment of a variable length antenna or control signal shown. For example, one of ordinary skill in the art may readily derive alternate configurations of conductor lengths and switches from that shown. Such embodiments are contemplated to be within the scope of the present disclosure.

Figure 3B:
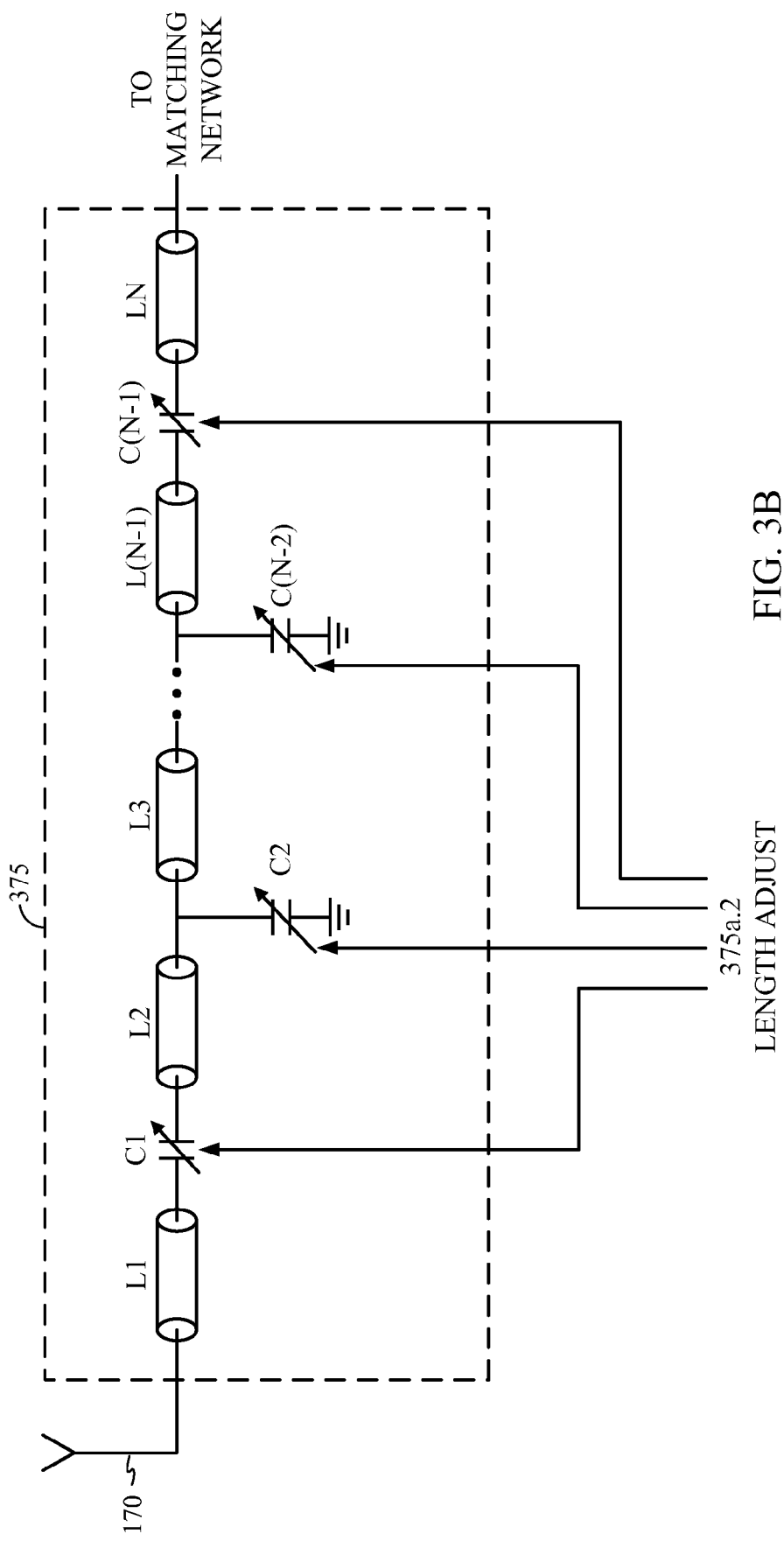
FIG. 3B shows an alternative embodiment of an antenna having electrical length adjustable by a control signal.

FIG. 3B shows an alternative embodiment of an antenna having electrical length adjustable by a control signal. In FIG. 3B, varactors (variable capacitors) C1 through C(N-1) are alternately coupled in series and in shunt with the conductors L1 through LN. The capacitance associated with each varactor is controlled by the composite control signal 375a.2. By controlling the capacitance of the varactors, control signal 375a.2 may control the electrical length of the antenna.

One of ordinary skill in the art will appreciate that FIG. 3B is intended only to illustrate an embodiment of the disclosure wherein the electrical length of an antenna is adjusted using controlled varactors. In alternative embodiments, fewer or more varactors may be provided than shown, and the varactors may be coupled to the conductors L1 through LN differently than shown, e.g., in series, all in shunt, or any combination thereof in an embodiment, the technique for adjusting antenna electrical length using varactors depicted in FIG. 3B may be combined with that for adjusting the antenna physical length depicted in FIG. 3A.

Note the configuration of control signals 375a.1 and 375a.2 depicted in FIG. 3A is not meant to limit the scope of the generalized control signal 375a shown in FIG. 3 to only the configurations shown. Control signal 375a may generally be digital or analog, and may comprise a single signal or a plurality of signals, depending on the particular characteristics of the variable antenna length unit 375. Such embodiments are contemplated to be within the scope of the present disclosure.

In an embodiment, control signal 375a may be supplied by RF module 105. In alternative embodiments, the signal 375a may be supplied by data processor 180, or by any other available source.

Figure 4:
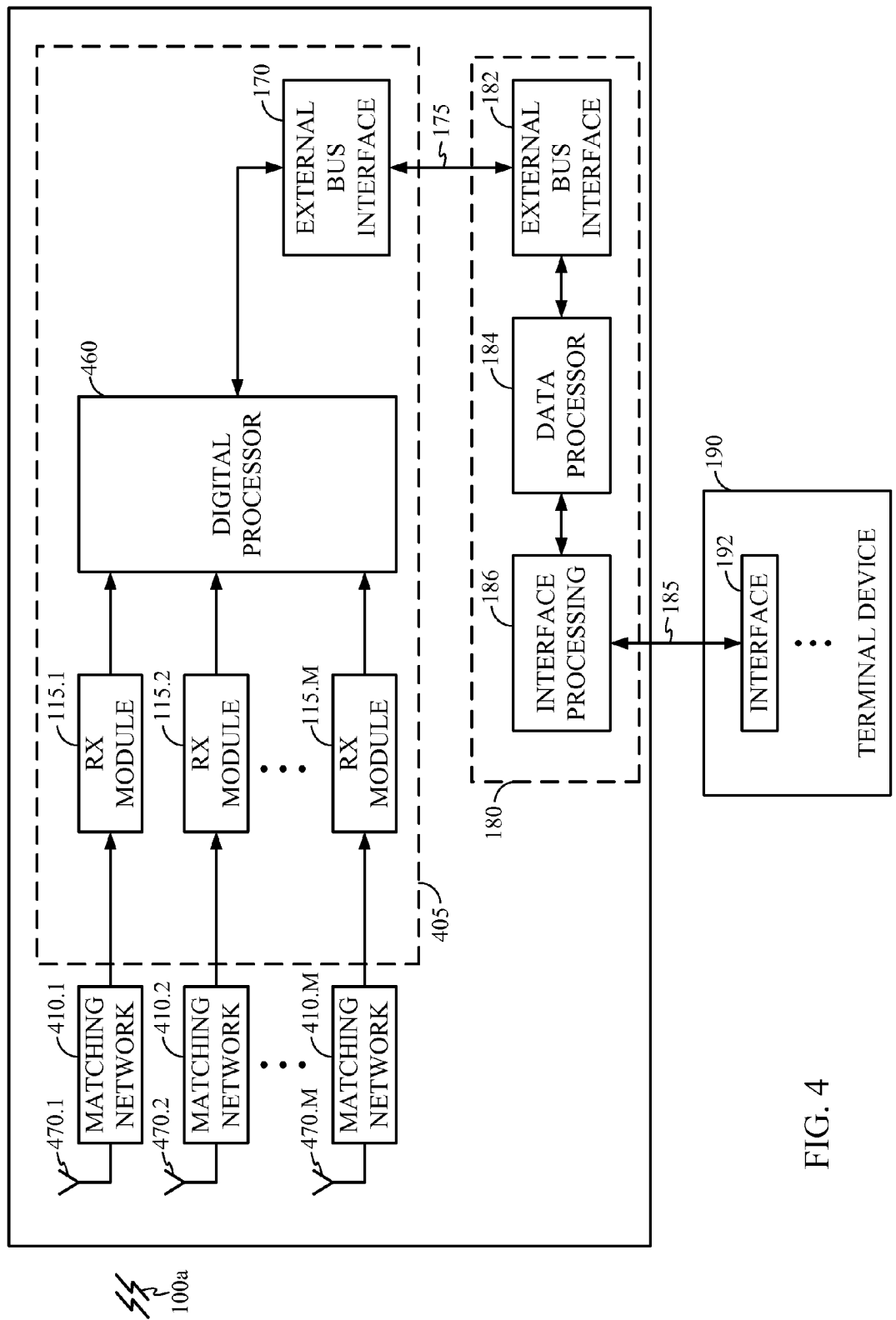
FIG. 4 depicts a further embodiment according to the present disclosure for varying the electrical characteristics of wireless device by providing multiple antennas.

FIG. 4 depicts a further embodiment according to the present disclosure for varying the electrical characteristics of wireless device 100 by providing multiple antennas 470.1 through 470.M. In FIG. 4, M antennas are provided with corresponding matching networks 410.1 through 410.M and individual RX modules 115.1 through 115.M. The gain of the signal received from each RX signal path may be adjusted in the digital processor 460. In an embodiment, the gains are adjusted to at least partially compensate for changes in the antenna characteristics. The gain-adjusted signals may then be combined to form a composite received signal for the data processor 184.

In an embodiment, the computation of the gains to be applied to each RX signal path may be performed by the data processor 184 in processor 180 and/or the digital processor 460. Alternatively, the computations may be done exclusively in the data processor 184 or the digital processor 460. Such embodiments are contemplated to be within the scope of the present disclosure.

In an embodiment, a plurality of the techniques disclosed hereinabove may be combined together to allow simultaneous adjustment of multiple antenna parameters. For example, an adjustable antenna matching network 210 depicted in FIG. 2, a variable antenna length unit 375 depicted in FIG. 3, and a plurality of antennas and signal paths depicted in FIG. 4 may all be present in a single wireless device, and such configurable elements may be provided with a composite control signal for adjusting each of the configurable parameters to their preferred settings. Such embodiments are contemplated to be within the scope of the present disclosure.

Figure 5:
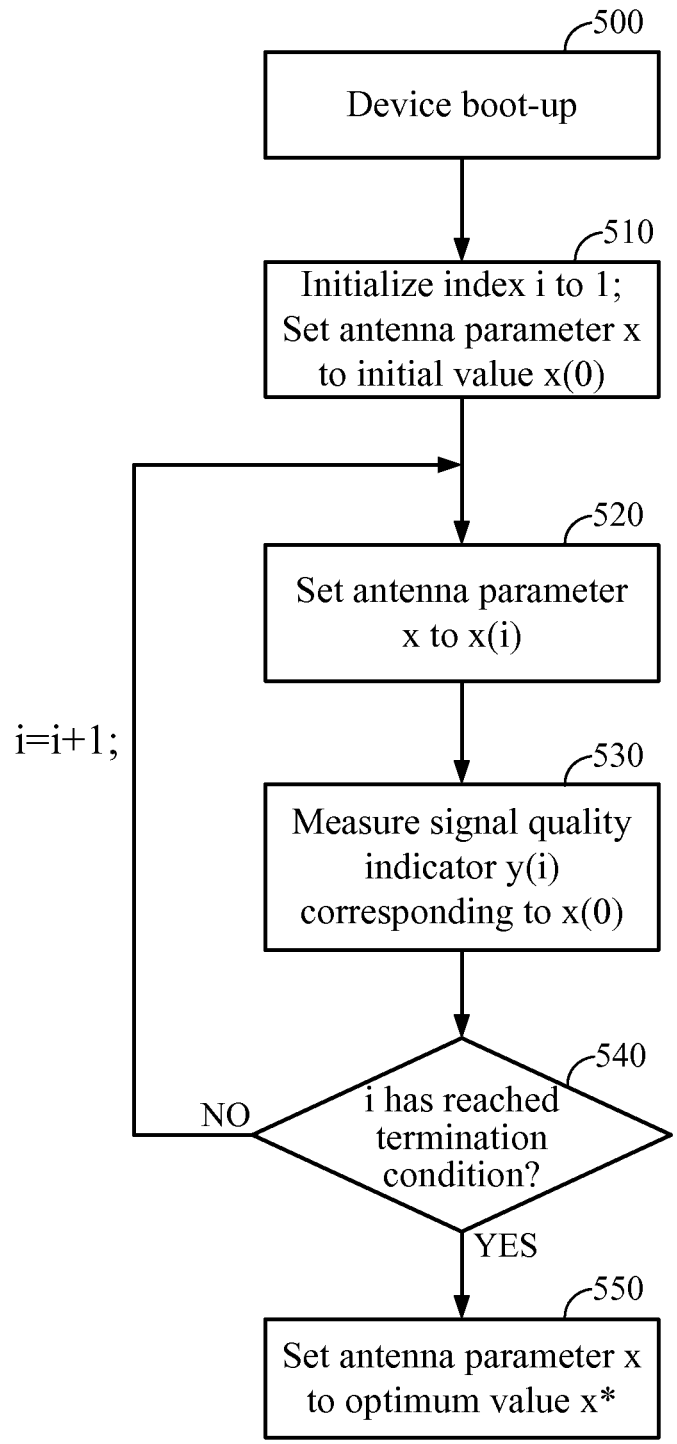
FIG. 5 depicts an embodiment of a method according to the present disclosure for determining preferred settings for the antenna parameters disclosed hereinabove.

FIG. 5 depicts an embodiment of a method according to the present disclosure for determining preferred settings for the antenna parameters disclosed hereinabove. In FIG. 5, the method commences at step 500 with wireless device boot-up. In an embodiment, device boot-up may correspond to when a plug-in wireless device such as a wireless data card is plugged into a host device such as a personal computer. Note in alternative embodiments, the method for determining preferred settings need not commence only on device boot-up, as depicted in FIG. 5. Other events can also trigger the method depicted, e.g., the detection of degradation in the transmitted or received signal quality, the periodic lapsing of a counter, user-initiated trigger, etc. Such embodiments are contemplated to be within the scope of the present disclosure.

At step 510, a loop index i is initialized to 1. A configurable antenna parameter x is also set to an initial value x(0).

At step 520, the configurable antenna parameter x is set to a corresponding value x(i), wherein x(i) is a value selected from the set of values that includes all configurable settings for the parameter x, or some subset of those configurable settings depending on a particular usage scenario. For example, in an embodiment wherein x corresponds to a configurable antenna length, and there are four total configurable lengths, then x(i) may be swept through all four configurable lengths, or x(i) may be swept through only two of the four configurable lengths when a particular usage scenario is detected.

At step 530, a signal quality indicator y(i) corresponding to x(i) is measured. In an embodiment, a signal quality indicator may be a signal-to-noise-plus-interference ratio (SINR) computed from a received signal. In an alternative embodiment, the indicator may be a received signal strength indicator (RSSI). In yet an alternative embodiment, the indicator may be any metric for measuring signal quality known to one of ordinary skill in the art. Such embodiments are contemplated to be within the scope of the present disclosure.

Note in an embodiment (not shown), the process may automatically terminate at step 530 if the signal quality indicator corresponding to the index i determined at step 530 is deemed satisfactory according to some criteria. In this case, the antenna parameter x may be set to x(i) without evaluating the remaining candidates. Such an embodiment is contemplated to be within the scope of the present disclosure.

At step 540, the index i is checked to determine whether a termination condition is reached. For example, the index i can be compared with the total number of configurable settings for the antenna parameters to be swept. If step 540 returns NO, then the index i is incremented (i=i+1;), and the method returns to step 520. If step 540 returns YES, then the method proceeds to step 550.

At step 550, the antenna parameter x is set to an optimum value x*. In an embodiment, the optimum value x* is determined from the measured signal quality indicators y(i) derived at step 530. In an embodiment, the optimum value x* may be chosen as the setting x(i) corresponding to the best measured signal quality indicator y(i). For example, in an embodiment wherein the indicator is a measured SINR, then the optimum value x* may be chosen as the setting x(i) corresponding to the best measured SINR.

Note the method depicted in FIG. 5 is shown for illustration purposes only, and is not meant to limit the scope of the present disclosure to any particular method of sweeping through antenna parameters and/or determining optimal settings therefor. One of ordinary skill in the art may readily derive alternative embodiments for sweeping through multiple antenna parameters to determine a preferred setting for each antenna parameter. In an embodiment employing multiple antennas such as depicted in FIG. 4, one of ordinary skill in the art will also realize that a variety of alternative methods exist for determining preferred settings for multiple antenna paths in the context of, e.g., antenna beamforming. Such embodiments are contemplated to be within the scope of the present disclosure.

Figure 6:
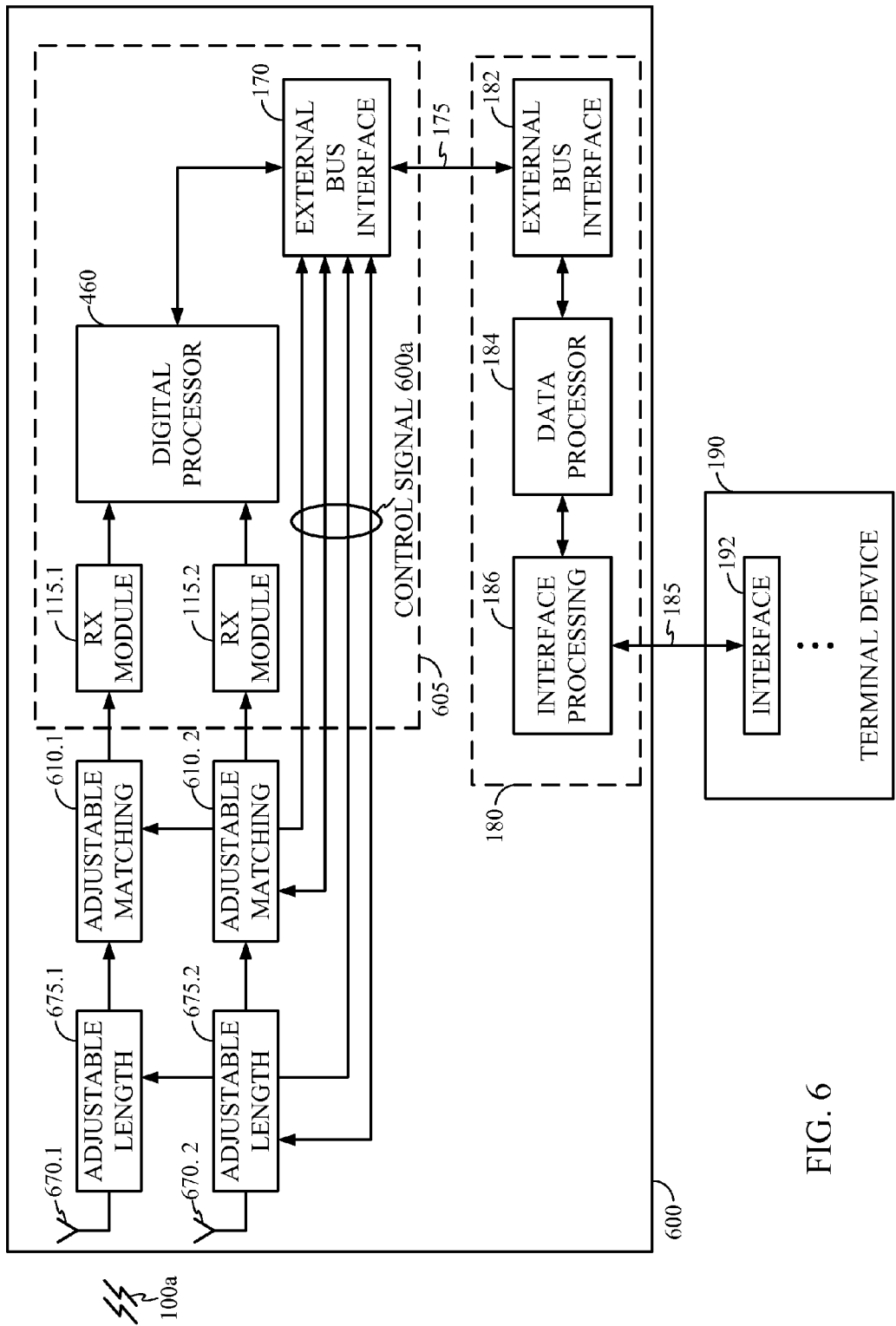
FIG. 6 depicts an embodiment employing a plurality of the techniques described herein.

FIG. 6 depicts an embodiment employing a plurality of the techniques described herein. In FIG. 6, two antennas 670.1 and 670.2 are provided according to a multiple-antenna embodiment of the present disclosure. Corresponding adjustable length blocks 675.1 and 675.2 are provided to adjust the electrical length of each of the antennas, as previously described herein. Adjustable matching blocks 610.1 and 610.2 are further provided to adjust the antenna matching of each of the antennas. The settings of blocks 670.1, 670.2, 675.1, and 675.2 are controlled by a composite control signal 600a supplied by RF module 605. Control signal 600a may in turn be specified by the data processor 184 within processor 180 via the external bus interfaces 170 and 182. Alternatively, the control signal 600a may be supplied directly by data processor 180.

In FIG. 6, the data processor 184 may implement an algorithm such as depicted in FIG. 5 to determine preferred settings for the antenna length and antenna matching parameters. Data processor 184 may also implement beamforming algorithms to determine optimal weights to be applied to the signals from the multiple antennas. The settings and weights determined by data processor 184 may be signaled to the RF module 605 via external bus 175.

Note the embodiment in FIG. 6 is shown for illustration purposes only, and is not meant to restrict the scope of the present disclosure to the particular embodiment shown.

Figure 7:
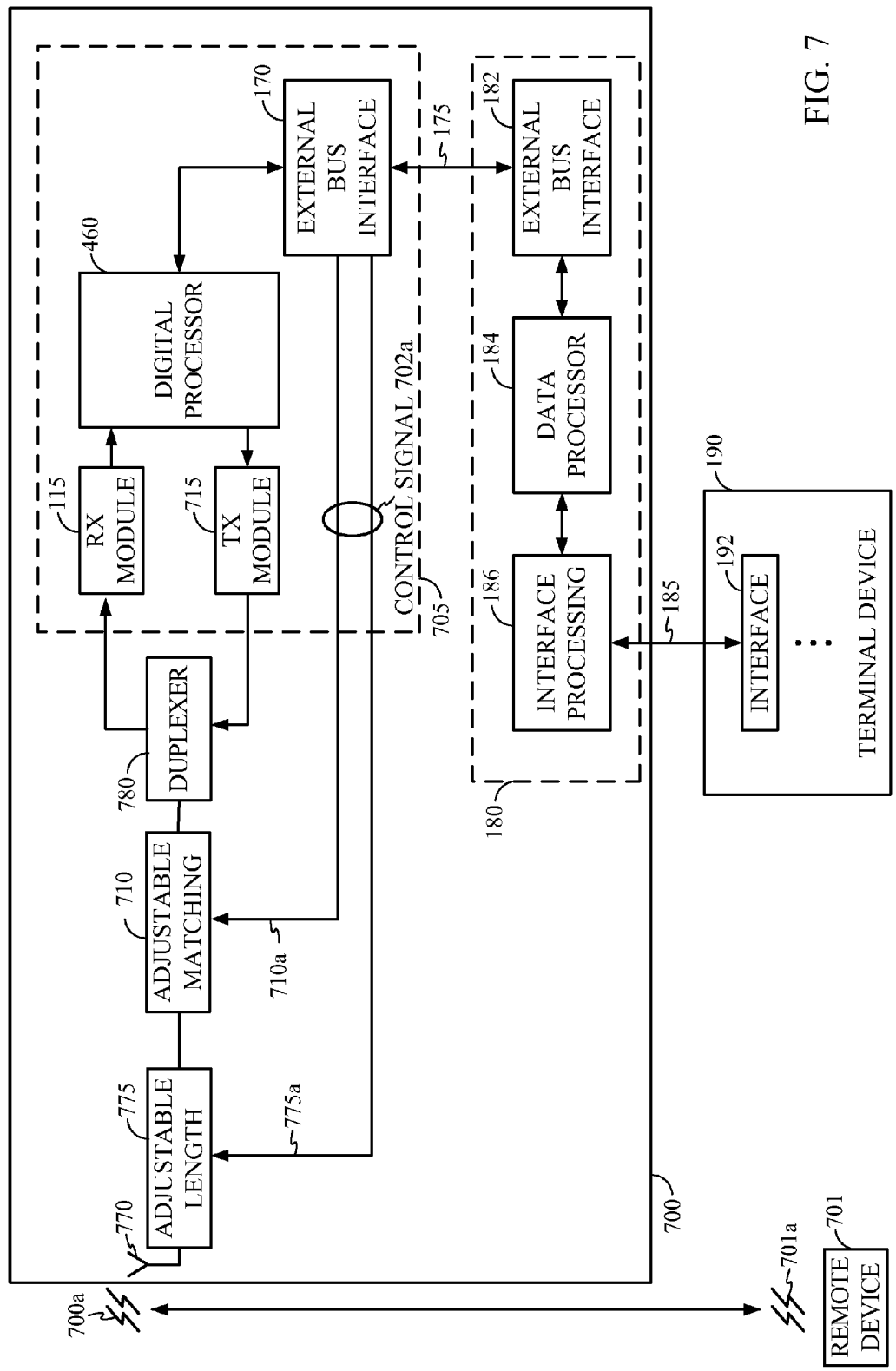
FIG. 7 depicts an embodiment of the present disclosure wherein antenna parameters are adjusted to further optimize for antenna transmission.

FIG. 7 depicts an embodiment of the present disclosure wherein antenna parameters may be further adjusted to optimize for antenna transmission. In FIG. 7, a wireless device 700 communicates with a remote device 701. Signal 700a represents a signal received or transmitted by the wireless device 700, while signal 701a represents a signal received or transmitted by the remote device 701. In an embodiment, the wireless device 700 may be a data card coupleable to a mobile personal computer to enable transmission and reception over a CDMA (code division multiple access) cellular network. In such an embodiment, remote device 701 may be a CDMA base station.

In FIG. 7, an RX module 115 and a TX module 715 are simultaneously provided in an RF module 705 for a wireless device 700. The RX module 115 and TX module 715 are both coupled to the antenna 770 via an adjustable length unit 775, an adjustable matching unit 710, and a duplexer 780. Control signal 710a is provided to control the adjustable matching unit 710, while control signal 775a is provided to control the adjustable length unit 775. Control signals 710a and 775a together form a composite control signal 702a.

Note one of ordinary skill in the art will appreciate that the wireless device 700 may also incorporate multiple antennas and RE signal paths, as discussed with respect to FIG. 4. One of ordinary skill in the art will realize that the multiple antennas may be correspondingly configured for TX as well as RX. Such embodiments are contemplated to be within the scope of the present disclosure.

Figure 8:
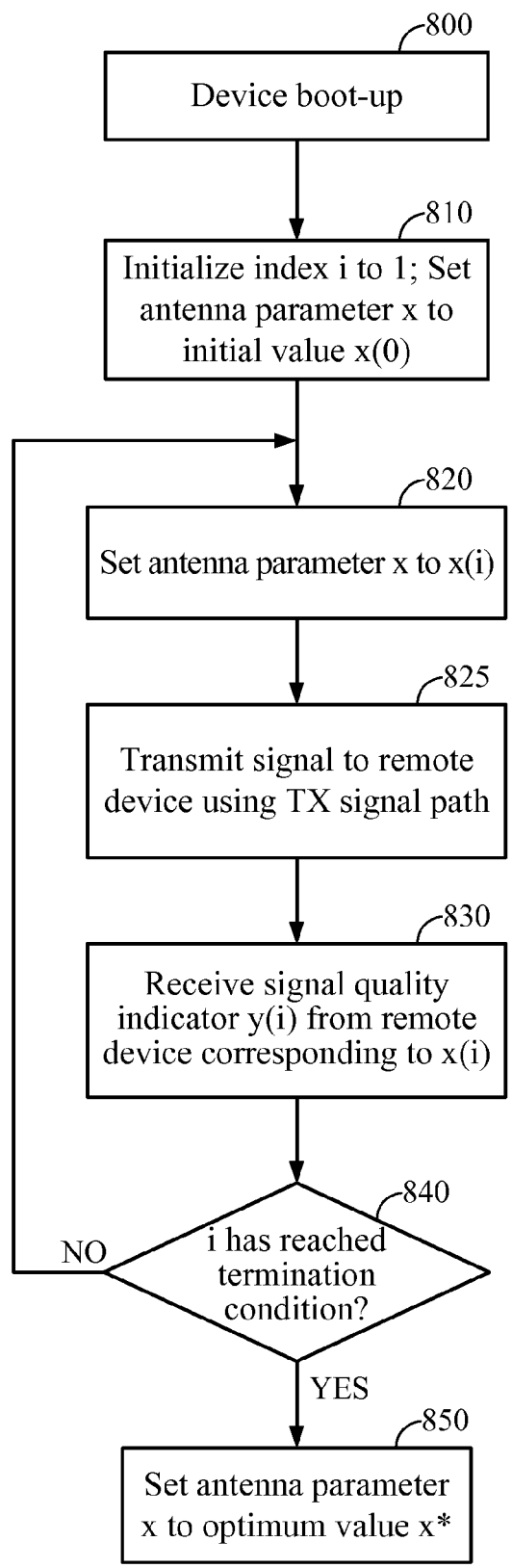
FIG. 8 depicts an embodiment of a method according to the present disclosure for determining preferred settings for the antenna parameters for a TX signal path.

Preferred techniques for selecting a control signal such as 710a for an RX signal path have been previously disclosed hereinabove. Further disclosed hereinbelow with reference to FIG. 8 are techniques for selecting a control signal 710a for the TX signal path. Note while the signal 710a is shown specifically for adjusting the adjustable matching unit of FIG. 7, one of ordinary skill in the art will realize that the techniques described below may be readily applied to adjust a control signal to optimize any TX antenna parameter. Such embodiments are contemplated to be within the scope of the present disclosure.

FIG. 8 depicts an embodiment of a method according to the present disclosure for determining preferred settings for the antenna parameters for the TX signal path. In FIG. 8, the method commences at step 800 with wireless device boot-up. Note in alternative embodiments, the method for determining preferred settings need not commence only on device boot-up, and other events can also trigger the method, e.g., the detection of degradation in the transmitted or received signal quality, the periodic lapsing of a counter, user-initiated trigger, etc.

At step 810, a loop index i is initialized to 1. A configurable antenna parameter x is also set to an initial value x(0).

At step 820, an antenna parameter x is set to a corresponding value x(i), wherein x(i) is a value selected from a set of values that includes all configurable settings for the parameter x, or some subset of those configurable settings depending on a particular usage scenario. For example, in an embodiment wherein x corresponds to a configurable matching unit, and there are four configurable match settings, then x(i) may be swept through all four configurable settings, or x(i) may be swept through only two of the four configurable settings when a particular usage is detected.

Returning to FIG. 8, at step 825, the wireless device transmits a signal to a remote device, such as device 701 depicted in FIG. 7, using the antenna parameter setting corresponding to x(i) as set at step 820. At step 830, a signal quality indicator y(i) is received from the remote device, such as remote device 701 in FIG. 7. In an embodiment, the remote device may compute a signal quality indicator for the signal transmitted by the wireless device at step 820 corresponding to the setting x(i), and received by the remote device. The signal quality indicator may be an SINR, an RSSI, a measured TX power level, a result of a cyclic-redundancy code (CRC) check, or any other metric for measuring signal quality known to one of ordinary skill in the art. In an embodiment, the indication received by the wireless device may be a power control message from the remote device, instructing the wireless device to either increase its transmit power or decrease its transmit power. One of ordinary skill in e art will realize that the power control command received from the remote device provides information to the wireless device on the quality of the transmitted signal, and may thus be used by the wireless device to determine whether the quality of the signal transmitted corresponding to setting x(i).

Note in an embodiment (not shown), the process may automatically terminate at step 830 if the signal quality indicator corresponding to the index i determined at step 830 is deemed satisfactory according to some criteria. In this case, the antenna parameter x may be set to x(i) without evaluating the remaining candidates. Such an embodiment is contemplated to be within the scope of the present disclosure.

At step 840, the index i is checked to determine whether a termination condition is reached. For example, the index i can be compared with a maximum number I of parameter configurations. If step 840 returns NO, then the index i is incremented (i=i+1;), and the method returns to step 820. If step 840 returns YES, then the method proceeds to step 850.

At step 850, the antenna parameter x is set to an optimum value x*. In an embodiment, the optimum value x* is determined from the received signal quality indicators y(i) measured at step 830. In an embodiment, the optimum value x* may be chosen as the setting x(i) corresponding to the best received signal quality indicator y(i). For example, in an embodiment wherein the indicator is a measured SINR, then the optimum value x* may be chosen as the setting x(i) corresponding to the best measured SINR at the remote device.

Note the method depicted in FIG. 8 is shown for illustration purposes only, and is not meant to limit the scope of the present disclosure to any particular method of sweeping through antenna parameters and/or determining optimal settings therefor. One of ordinary skill in the art may readily derive alternative embodiments that sweep through multiple antenna parameters for both the RX and TX signal path to determine a preferred setting for each antenna parameter. Such embodiments are contemplated to be within the scope of the present disclosure.

Based on the teachings described herein, it should be apparent that an aspect disclosed herein may be implemented independently of any other aspects and that two or more of these aspects may be combined in various ways. In one or more exemplary embodiments, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

The instructions or code associated with a computer-readable medium of the computer program product may be executed by a computer, e.g., by one or more processors, such as one or more digital signal processors (DSPs), general purpose microprocessors, ASICs, FPGAs, or other equivalent integrated or discrete logic circuitry.

In this specification and in the claims, it will be understood that when an element is referred to as being "connected to" or "coupled to" another element, it can be directly connected or coupled to the other element or intervening elements may be present. In contrast, when an element is referred to as being "directly connected to" or "directly coupled to" another element, there are no intervening elements present.

A number of aspects and examples have been described. However, various modifications to these examples are possible, and the principles presented herein may be applied to other aspects as well. These and other aspects are within the scope of the following claims.

The invention claimed is:

1. A method for setting an electrical length or resonant frequency for an antenna in a wireless device, the method comprising:
   coupling a control signal to a variable antenna electrical length module, the variable antenna electrical length module having a plurality of selectable lengths;
   setting the control signal to a setting;
   measuring a signal quality metric corresponding to the setting;
   if the measured signal quality metric meets predetermined criteria, setting the control signal to said setting during operation; and
   selecting the length of the variable antenna electrical length module in response to the control signal;
   wherein the variable antenna electrical length module comprises a diode having an electrical property adjustable by the control signal.

2. The method of claim 1, the plurality of selectable lengths comprising a plurality of physical lengths.

3. The method of claim 1, the variable antenna electrical length module comprising:
   at least one varactor coupled to a conductor, the capacitance of the at least one varactor adjustable by the control signal.

4. The method of claim 3, the at least one varactor shunt-coupled to the conductor.

5. The method of claim 3, the variable antenna electrical length module further comprising:
   a plurality of conductors, the at least one varactor series coupling one of said plurality of conductors to another one of said plurality of conductors.

6. The method of claim 3, the variable antenna electrical length module further comprising:
   a plurality of conductors, the at least one varactor comprising one varactor shunt-coupled to at least one of the plurality of conductors, the at least one varactor further comprising one varactor series-coupling one of the plurality of conductors to another one of the plurality of conductors.

7. The method of claim 1, the variable antenna length module comprising a plurality of conductors coupled to a plurality of switches, the method further comprising:
   closing or opening the plurality of switches using the control signal to adjust the total length of the plurality of conductors.

8. The method of claim 1, the predetermined criteria comprising exceeding a signal quality threshold.

9. The method of claim 8, the signal quality metric being a signal-to-interference-plus-noise ratio (SINR), the signal quality threshold being an SINR threshold.

10. The method of claim 8, the signal quality metric being a received signal strength indicator (RSSI), the signal quality threshold being an RSSI threshold.

11. The method of claim 1, further comprising:
    setting the control signal to a further setting;
    measuring the signal quality metric corresponding to the further setting;
    during operation, setting the control signal to one setting having a signal quality metric corresponding to a signal of highest quality.

12. The method of claim 11, wherein the variable antenna length module comprises a plurality of conductors coupled to a plurality of switches, the method further comprising:

closing or opening the plurality of switches using the control signal to adjust the total length of the plurality of conductors.

13. The method of claim 11, wherein the predetermined criteria comprises exceeding a signal quality threshold.

14. The method of claim 13, the signal quality metric being a signal-to-interference-plus-noise ratio (SINR), and the signal quality threshold being an SINR threshold.

15. The method of claim 13, the signal quality metric being a received signal strength indicator (RSSI), and the signal quality threshold being an RSSI threshold.

16. The method of claim 1, further comprising:
setting the control signal to the first setting in response to the wireless device being coupled to a terminal device.

17. The method of claim 1, further comprising:
transmitting a signal to a remote device while the control signal is set to the setting;
receiving a signal quality metric from the remote device corresponding to the setting;
setting the control signal to a further setting;
transmitting a signal to the remote device while the control signal is set to the further setting;
receiving the signal quality metric from the remote device corresponding to the further setting; and
during operation, setting the control signal to one setting having a better received signal quality metric, the better received signal quality metric corresponding to a better signal quality.

18. The method of claim 17, wherein the variable antenna length module comprises a plurality of conductors coupled to a plurality of switches, the method further comprising:
closing or opening the plurality of switches using the control signal to adjust the total length of the plurality of conductors.

19. The method of claim 17, wherein the predetermined criteria comprises exceeding a signal quality threshold.

20. The method of claim 19, the signal quality metric being a signal-to-interference-plus-noise ratio (SINR), and the signal quality threshold being an SINR threshold.

21. The method of claim 19, the signal quality metric being a received signal strength indicator (RSSI), and the signal quality threshold being an RSSI threshold.

22. A wireless device comprising:
at least one antenna;
a variable antenna electrical length module, the variable antenna electrical length module having a plurality of selectable lengths; and
a controller configured to provide a control signal, wherein the controller is configured to:
set the control signal to a setting;
measure a signal quality metric corresponding to the setting; and
if the measured signal quality metric meets predetermined criteria, set the control signal to said setting during operation;
wherein the variable antenna electrical length module is configured to select one length in response to the control signal, and wherein the variable antenna electrical length module comprises a diode having an electrical property adjustable by the control signal.

23. The wireless device of claim 22, the variable antenna length module comprising a plurality of conductors coupled to a plurality of switches.

24. The wireless device of claim 23, the variable antenna length module comprising a plurality of conductors coupled to a plurality of switches, wherein the plurality of switches close or open using the control signal to adjust the total length of the plurality of conductors.

25. The wireless device of claim 22, the variable antenna electrical length module comprising:
at least one varactor coupled to a conductor, the capacitance of the at least one varactor adjustable by the control signal.

26. The wireless device of claim 25, the at least one varactor shunt-coupled to the conductor.

27. The wireless device of claim 25, the variable antenna electrical length module further comprising:
a plurality of conductors, the at least one varactor series coupling one of said plurality of conductors to another one of said plurality of conductors.

28. The wireless device of claim 25, the variable antenna electrical length module further comprising:
a plurality of conductors, the at least one varactor comprising one varactor shunt-coupled to at least one of the plurality of conductors, the at least one varactor further comprising one varactor series-coupling one of the plurality of conductors to another one of the plurality of conductors.

29. The wireless device of claim 22, the predetermined criteria comprising exceeding a signal quality threshold.

30. The wireless device of claim 29, the signal quality metric being a signal-to-interference-plus-noise ratio (SINR), the signal quality threshold being an SINR threshold.

31. The wireless device of claim 29, the signal quality metric being a received signal strength indicator (RSSI), the signal quality threshold being an RSSI threshold.

32. The wireless device of claim 22, wherein the controller is configured to:
set the control signal to a further setting;
measure the signal quality metric corresponding to the further setting; and
during operation, set the control signal to one setting having a signal quality metric corresponding to a signal of highest quality.

33. The wireless device of claim 22, wherein the controller is configured to:
set the control signal to the setting in response to the wireless device being coupled to a terminal device.

34. The wireless device of claim 22, wherein the controller is configured to:
transmit a signal to a remote device while the control signal is set to the setting;
receive a signal quality metric from the remote device corresponding to the setting;
set the control signal to a further setting;
transmit a signal to the remote device while the control signal is set to the further setting;
receive the signal quality metric from the remote device corresponding to the further setting; and
during operation, set the control signal to a setting having a better received signal quality metric, the better received signal quality metric corresponding to a better signal quality.

35. A wireless device comprising:
means for coupling a control signal to a variable antenna electrical length module, the variable antenna electrical length module having a plurality of selectable lengths;
means for setting the control signal to a setting;
means for measuring a signal quality metric corresponding to the setting;

means for setting the control signal to said setting during operation if the measured signal quality metric meets predetermined criteria; and means for selecting the length of the variable antenna electrical length module in response to the control signal;

wherein the variable antenna electrical length module comprises a diode having an electrical property adjustable by the control signal.

36. The wireless device of claim 35, the plurality of selectable lengths comprising a plurality of physical lengths.

37. The wireless device of claim 35, the variable antenna electrical length module comprising:

at least one varactor coupled to a conductor, the capacitance of the at least one varactor adjustable by the control signal.

38. The wireless device of claim 37, the at least one varactor shunt-coupled to the conductor.

39. The wireless device of claim 37, the variable antenna electrical length module further comprising:

a plurality of conductors, the at least one varactor series coupling one of said plurality of conductors to another one of said plurality of conductors.

40. The wireless device of claim 37, the variable antenna electrical length module further comprising:

a plurality of conductors, the at least one varactor comprising one varactor shunt-coupled to at least one of the plurality of conductors, the at least one varactor further comprising one varactor series-coupling one of the plurality of conductors to another one of the plurality of conductors.

41. The wireless device of claim 35, the variable antenna length module comprising a plurality of conductors coupled to a plurality of switches, the wireless device further comprising:

means for closing or opening the plurality of switches using the control signal to adjust the total length of the plurality of conductors.

42. The wireless device of claim 35, the predetermined criteria comprising exceeding a signal quality threshold.

43. The wireless device of claim 42, the signal quality metric being a signal-to-interference-plus-noise ratio (SINR), the signal quality threshold being an SINR threshold.

44. The wireless device of claim 42, the signal quality metric being a received signal strength indicator (RSSI), the signal quality threshold being an RSSI threshold.

45. The wireless device of claim 35, further comprising:
means for setting the control signal to a further setting;
means for measuring the signal quality metric corresponding to the further setting;
means for, during operation, setting the control signal to one setting having a signal quality metric corresponding to a signal of highest quality.

46. The wireless device of claim 35, further comprising:
means for setting the control signal to the setting in response to the wireless device being coupled to a terminal device.

47. The wireless device of claim 35, further comprising:
means for transmitting a signal to a remote device while the control signal is set to the setting;
means for receiving a signal quality metric from the remote device corresponding to the setting;
means for setting the control signal to a further setting;
means for transmitting a signal to the remote device while the control signal is set to the further setting;
means for receiving the signal quality metric from the remote device corresponding to the further setting; and
means for, during operation, setting the control signal to one setting having a better received signal quality metric, the better received signal quality metric corresponding to a better signal quality.

48. A non-transitory computer-readable medium for determining an optimal antenna electrical length for an antenna in a wireless device, the computer-readable medium comprising:

code for coupling a control signal to a variable antenna electrical length module, the variable antenna electrical length module having a plurality of selectable lengths; and code for selecting the length of the variable antenna electrical length module in response to the control signal.

49. A non-transitory computer-readable medium for determining an optimal antenna electrical length for an antenna in a wireless device, the computer-readable medium comprising:

code for causing a computer to set the antenna electrical length to a first setting;
code for causing a computer to measure a signal quality metric corresponding to the first setting;
code for causing a computer to set the antenna electrical length to a second setting;
code for causing a computer to measure the signal quality metric corresponding to the second setting; and
code for causing a computer to, during operation, setting the antenna electrical length to a setting having a signal quality metric corresponding to a signal of highest quality.

50. The non-transitory computer-readable medium of claim 49, further comprising:

code for causing a computer to set the first setting in response to the wireless device being coupled to a terminal device.

51. A non-transitory computer-readable medium for determining an optimal antenna electrical length for an antenna in a wireless device, the non-transitory computer readable medium comprising:

code for causing a computer to set the antenna electrical length to a first setting;
code for causing a computer to measure a signal quality metric corresponding to the first setting; and
code for causing a computer to, if the measured signal quality metric meets predetermined criteria, set the antenna electrical length to the first setting during operation.

52. A wireless device comprising:
means for selecting an impedance of a variable antenna match having a plurality of selectable impedances in response to a control signal;
means for setting the control signal to a first setting;
means for transmitting a signal to a remote device while the control signal is set to the first setting;
means for receiving a signal quality metric from the remote device corresponding to the first setting;
means for setting the control signal to a second setting;
means for transmitting a signal to the remote device while the control signal is set to the second setting;
means for receiving the signal quality metric from the remote device corresponding to the second setting; and
means for setting the control signal to a setting having a best received signal quality metric during operation, wherein the best received signal quality metric corresponds to a better signal quality.

53. The wireless device of claim 52, wherein means for setting the control signal to a setting having a best received signal quality metric during operation comprises means for setting the control signal in response to a power control command instructing the wireless device to decrease transmit power.

54. The wireless device of claim 52, wherein the signal quality metric received from the remote device comprises a signal-to-interference-plus-noise ratio (SINR).

55. A wireless device comprising:
a variable antenna match comprising a plurality of selectable impedances;
means for coupling a control signal to the variable antenna match;
means for setting the control signal to a setting;
means for measuring a signal quality metric corresponding to the setting;
means for setting the control signal to said setting during operation if the measured signal quality metric meets predetermined criteria;
means for selecting the impedance of the variable antenna match in response to the control signal;
a variable antenna electrical length module having a plurality of selectable lengths;
means for coupling the control signal to the variable antenna electrical length module; and
means for selecting the length of the variable antenna electrical length module in response to the control signal.

56. The wireless device of claim 55, wherein the plurality of selectable lengths comprises a plurality of physical lengths.

57. The wireless device of claim 55, wherein the variable antenna electrical length module further comprises:
at least one varactor coupled to a conductor, the capacitance of the at least one varactor being adjustable by the control signal.

58. The wireless device of claim 57, wherein the at least one varactor is shunt-coupled to the conductor.

59. The wireless device of claim 57, the variable antenna electrical length module further comprising:
a plurality of conductors,
wherein the at least one varactor couples one of said plurality of conductors to another one of said plurality of conductors in series.

60. The wireless device of claim 57, wherein the variable antenna electrical length module further comprises:
a plurality of conductors,
wherein the at least one varactor comprises one varactor shunt-coupled to at least one of the plurality of conductors, and
wherein the at least one varactor further comprises one varactor series-coupling one of the plurality of conductors to another one of the plurality of conductors.

61. The wireless device of claim 55, further comprising:
means for selecting the length of the variable antenna length module from each of the plurality of antenna selectable antenna lengths; and
means for selecting the impedance from each of the plurality of selectable impedances to optimize a signal quality metric.

62. A wireless device comprising:
a variable antenna electrical length module comprising a plurality of selectable lengths;
means for coupling a control signal to the variable antenna electrical length;
means for selecting the length of the variable antenna electrical length module in response to the control signal;
means for setting the control signal to a setting;
means for measuring a signal quality metric corresponding to the setting; and
means for setting the control signal to said setting during operation if the measured signal quality metric meets predetermined criteria;
wherein the variable antenna electrical length module comprises a diode having an electrical property adjustable by the control signal.

63. The wireless device of claim 62, wherein the plurality of selectable lengths comprise a plurality of physical lengths.

64. The wireless device of claim 62, wherein the variable antenna electrical length module comprises:
at least one varactor coupled to a conductor, the at least one varactor having a capacitance that is adjustable by the control signal.

65. The wireless device of claim 64, wherein the at least one varactor is shunt-coupled to the conductor.

66. The wireless device of claim 64, wherein the variable antenna electrical length module further comprises:
a plurality of conductors,
wherein the at least one varactor couples one of said plurality of conductors to another one of said plurality of conductors in series.

67. The wireless device of claim 64, wherein the variable antenna electrical length module further comprises:
a plurality of conductors,
wherein the at least one varactor comprises one varactor shunt-coupled to at least one of the plurality of conductors, and
wherein the at least one varactor further comprises one varactor series-coupling one of the plurality of conductors to another one of the plurality of conductors.

68. The wireless device of claim 62, wherein the variable antenna length module comprises a plurality of conductors coupled to a plurality of switches, the wireless device further comprising:
means for closing or opening the plurality of switches using the control signal to adjust the total length of the plurality of conductors.

69. The wireless device of claim 62, wherein means for setting the control signal to said setting during operation if the measured signal quality metric meets predetermined criteria comprises means for setting the control signal to said setting during operation if the measured signal quality metric exceeds a signal quality threshold.

70. The wireless device of claim 62, wherein means for measuring a signal quality metric corresponding to the setting comprises means for measuring a signal-to-interference-plus-noise ratio (SINR), and
wherein means for setting the control signal to said setting during operation if the measured signal quality metric meets predetermined criteria comprises means for setting the control signal to said setting during operation if the measured signal quality metric exceeds an SINR threshold.

71. The wireless device of claim 62, wherein means for measuring a signal quality metric corresponding to the setting comprises means for measuring a received signal strength indicator (RSSI), and
wherein means for setting the control signal to said setting during operation if the measured signal quality metric meets predetermined criteria comprises means for setting the control signal to said setting during operation if the measured signal quality metric exceeds an RSSI threshold.

72. A wireless device comprising:
a variable antenna electrical length module having a plurality of selectable lengths;
means for coupling a control signal to the variable antenna electrical length module;
means for selecting the length of the variable antenna electrical length module in response to the control signal;
means for setting the control signal to a first setting;
means for measuring a signal quality metric corresponding to the first setting;
means for setting the control signal to a second setting;
means for measuring the signal quality metric corresponding to the second setting;
means for setting the control signal to a setting having a signal quality metric corresponding to a signal of highest quality during operation;
wherein the variable antenna electrical length module comprises a diode having an electrical property adjustable by the control signal.

73. A wireless device comprising:
a variable antenna electrical length module having a plurality of selectable lengths;
means for coupling a control signal to the variable antenna electrical length module;
means for selecting the length of the variable antenna electrical length module in response to the control signal;
means for setting the control signal to a first setting;
means for transmitting a signal to a remote device while the control signal is set to the first setting;
means for receiving a signal quality metric from the remote device corresponding to the first setting;
means for setting the control signal to a second setting;
means for transmitting a signal to the remote device while the control signal is set to the second setting;
means for receiving the signal quality metric from the remote device corresponding to the second setting; and
means for setting the control signal to a setting having a better received signal quality metric, the better received signal quality metric corresponding to a better signal quality during operation.

* * * * *